United States Patent [19]

Dale et al.

[11] 4,216,083

[45] Aug. 5, 1980

[54] PROCESS FOR COMPLETE OR SELECTIVE REMOVAL OF SALTS FROM AQUEOUS SOLUTION

[76] Inventors: Johannes Dale, Stasjonsveien 63, 1310 Blommenholm; Gerd Borgen, Grinda 4, Oslo 8, both of Norway

[21] Appl. No.: 944,064

[22] Filed: Sep. 19, 1978

[30] Foreign Application Priority Data

Sep. 19, 1977 [NO] Norway .................. 773215

[51] Int. Cl.$^2$ .................. B01D 15/06; B01D 15/08
[52] U.S. Cl. .................. 210/31 R; 210/32; 210/36; 210/39; 210/40; 252/412; 252/414; 252/420; 252/428
[58] Field of Search .................. 210/31 R, 36, 39, 40, 210/31 C, 32; 252/412, 414, 420, 428

[56] References Cited

U.S. PATENT DOCUMENTS

| | | | |
|---|---|---|---|
| 3,442,819 | 5/1969 | Herbert | 210/31 R |
| 3,562,295 | 2/1971 | Pedersen et al. | 260/338 |
| 3,728,257 | 4/1973 | Fuxelius | 210/36 |
| 3,928,386 | 12/1975 | Dale et al. | 260/338 |

FOREIGN PATENT DOCUMENTS

| | | |
|---|---|---|
| 132200 | 1/1973 | Norway . |
| 129384 | 4/1974 | Norway . |
| 525017 | 8/1972 | Switzerland . |
| 831745 | 3/1960 | United Kingdom . |

OTHER PUBLICATIONS

Dale et al., Acta Chem., Scand, 26, 1471-1478 (1972).

*Primary Examiner*—Charles N. Hart
*Assistant Examiner*—Ferris H. Lander
*Attorney, Agent, or Firm*—Wenderoth, Lind & Ponack

[57] ABSTRACT

A process by which salts are removed or recovered from an aqueous solution by means of a polyether, by contacting the aqueous solution with active carbon impregnated with a cyclic or linear polyether, and then eluting ether and salt successively from the carbon. The aqueous solution of salts may be passed through a column packed with the active carbon impregnated with a polyether. The polyether may be recovered from the carbon by elution with a nonpolar or slightly polar water-immiscible organic solvent, and the salt(s) may then be recovered by elution with water.

6 Claims, No Drawings

PROCESS FOR COMPLETE OR SELECTIVE REMOVAL OF SALTS FROM AQUEOUS SOLUTION

This invention relates to a process for complete or partial extraction of salts from aqueous solution, in order to purify such solutions, or in order to remove certain salts selectively and to recover these.

It is well known that certain polyethers may form cation complexes with a number of salts, including salts of alkali and alkaline earth metals, both in organic solvents and in aqueous solution. These polyethers may either be compounds having an open chain, such as oligo- and polyethylene glycols and oligo- and polypropylene glycols of the formula

in which n is 4–200 and X is hydrogen or methyl respectively, and the so called "glymes" (dimethoxy derivates of oligo-ethylene glycols), or macrocyclic compounds, viz. the particularly effective so called "crown-ethers", of which cyclic oligomers of ethylene oxide of the formula

in which n is 4–8, are of particularly great interest for practical purposes.

In the ether complexing the cation acquires a lipophilic "surface", which has the effect that several salts, which otherwise are soluble in water only, will also become soluble in organic solvents such as benzene and chloroform. It is therefore of considerable interest to investigate the possibilities for extracting salts from water and into such organic solvents. It should be possible in this way to desalt saline water, either completely or selectively, or to remove undesired salt-like contaminations from drinking water, or to remove harmful salts from waste water etc. This has already been found possible when the anion also is lipophilic, for instance picrate (U.S Pat. No. 3,562,295) and p-toluene sulphonate (J. Dale and P.O. Kristiansen, Acta Chem. Scand. 26, 1471 (1972), but the distribution coefficient is far too unfavourable when the anion is hydrophilic and prefers solvation by water molecules, as is the case with the common inorganic anions (chloride, nitrate, sulphate, phosphate, etc.).

A possible solution to this problem would be to anchor the complexing polyether to the surface of an insoluble carrier substance. This could for instance be achieved by preparing water-insoluble polymer particles from a monomer which already carries the complexing ligand (the polyether) as substituent. However, a tedious synthesis of an exotic monomer would in that case be necessary, and it would represent a waste of such expensive material since only the surface of each particle is available to the salt.

We have now surprisingly found that the polyethers of the type mentioned above, particularly those which are formally derived from ethylene glycol and are readily prepared industrially from ethylene oxide, in spite of being very soluble in water, may be adsorbed from aqueous solution to the surface of granulated active carbon in an amount of up to 10 percent of the weight of the carbon, and can then not be eluted by use of water.

The resulting moist polyether-impregnated active carbon, preferably containing 4 to 6 percent of polyether, suitably packed in a column, has further been found to have the ability to adsorb salts, particularly alkali and alkaline earth metal salts, particularly with inorganic anions such as nitrate, halide, sulphate, phosphate, etc, more or less completely and more or less selectively, from aqueous solution. With respect to the amount of polyether adsorbed on the carbon, this is suitably somewhat above the stoichiometric amount needed to complex the amount of salt to be removed.

Recovery of the adsorbed salt and regeneration of the column may be carried out in two different ways. The complex salts together with any excess of polyether may be eluted entirely, for instance with a mixture of alcohol and water. The whole complex will then be eluted, and it must be decomplexed to separate the ether from the salt. Such a decomplexing is tedious and not preferred.

According to the invention the elution of the polyether in its entirety from the moist carbon is first carried out with a nonpolar or slightly polar organic solvent which is not miscible with water and which dissolves the ether, but not the complex in the presence of the adhering water. Suitable solvents are aromatic hydrocarbons and chlorinated hydrocarbons, particularly chlorinated alkanes. When the complex salt has an inorganic anion, methylene chloride is a particularly suitable solvent. The salt remaining on the carbon after the elution of the ether, may then be eluted with water.

With respect to the selectivity it is found that the cation selectivity is as expected in view of the established selectivity in complexing in solution. Thus, when the macrocyclic hexaether ("18-crown-6") is used, potassium salts are retained more firmly on the column than sodium salts. However, in addition a clear and surprisingly even higher anion selectivity is observed. Thus, iodides are retained more firmly than chlorides, so that in a salt mixture containing both K- and Na-ions, and both I- and Cl-ions, in which accordingly four salt combinations are possible, KI is retained selectively when "18-crown-6" is used as complexing polyether. Further, nitrates are retained more firmly than any of the halides or sulphates and phosphates. This is of great practical interest since it permits removal of infiltrated nitrates in ground water sources for drinking water supplies, which is of particular interest since active carbon is already used extensively for the removal of organic contaminations in drinking water. The treatment of sewage and waste water for the removal and recovery of larger amounts of nitrates is a further possible use. In addition to complete removal of salt and selective extraction from mixtures, the present process may also be used for analytical or chromatographic purposes or for the recovery of desired components from aqueous solutions.

It is obvious that the effects which have been described herein, may also be utilized for the recovery and purification of polyethers after use, for instance as additional solvent in chemical reactions, by taking up the residue in water after evaporation of the solvent and adsorbing it on active carbon, whereafter the ether is eluted, for instance with methylene chloride, as mentioned above.

The following examples will serve to illustrate typical conditions used in some embodiments of the invention. In addition, it is obvious that anyone skilled in the art can work out several new combinations of the described effects and find new fields of use.

EXAMPLE 1

This example illustrates a use for the reduction of the salt content in an aqueous nitrate solution, and recovery of the adsorbed salt and the cyclic polyether used.

20 g of granulated active carbon, particle size 1.5 mm, were boiled with water and packed in a glass column. 0.8 g of hexaoxacyclooctadecane ("18-crown-6") were dissolved in 10 ml of water and charged to the column. A solution of 0.22 g of $KNO_3$ (corresponding to a molar ratio of ether:salt = 1.5) in 150 ml of water was filtered four times through the column, and the solution then contained only 0.05 g of $KNO_3$ (corresponding to 77 percent adsorption on the column). With 100 ml of $CH_2Cl_2$, 78 percent of the cyclic ether used was eluted. 73% of the adsorbed amount of nitrate could then be eluted with 100 ml of water.

EXAMPLE 2

This example illustrates an alternative procedure for adsorption of nitrate from water by means of cyclic polyether.

20 g of active carbon, 0.8 g of hexaoxacyclooctadecane ("18-crown-6") and 0.22 g of $KNO_3$ in 150 ml of water was well stirred for 5 minutes. The slurry was filtered on a glass filter, and the filtrate was passed once through the carbon. The final filtrate contained 0.04 g of $KNO_3$ (corresponding to 82% adsorption). Regeneration was carried out as in example 1.

EXAMPLE 3

This example illustrates the use of an ether polymer for adsorption of nitrate from water.

20 g of active carbon packed in a glass column were charged with 0.8 g of polyethylene glycol 1540 ("Carbowax"), m.p. 43°-46° C., dissolved in water. A solution of 0.22 g of $KNO_3$ in 150 ml of water was filtered four times through the column, which procedure reduced the $KNO_3$-content in the filtrate to 0.12 g (corresponding to 45% adsorption). Regeneration was carried out as in example 1.

EXAMPLE 4

This example illustrates the use of an oligo-ethylene glycol for adsorption of nitrate from water.

20 g of active carbon packed in a glass column were charged with 1 g of tetraethylene glycol dissolved in water. A solution of 0.20 g of $KNO_3$ in 150 ml of water was filtered twice through the column. The $KNO_3$-content in the filtrate was 0.099 g, corresponding to 50% adsorption. Regeneration was carried out as in example 1.

EXAMPLE 5

This example illustrates the use of an oligo-ethylene glycol ether for adsorption of nitrate from water. 20 g of active carbon in a glass column were charged with 1 g of tetraethylene glycol dimethyl ether dissolved in water. A solution of 0.20 g of $KNO_3$ in 150 ml of water was filtered twice through the column. The $KNO_3$-content in the filtrate was 0.11 g (corresponding to 45% adsorption).

EXAMPLE 6

This example illustrates selective adsorption of $KNO_3$ from a mixture of $NaNO_3$ and $KNO_3$.

(a) 20 g of active carbon were boiled with water and packed in a glass column (diameter 2 cm). 0.8 g of hexaoxacyclooctadecane ("18-crown-6") were dissolved in 50 ml of water and added to the column. A solution of 0.19 g of $NaNO_3$ and 0.23 g of $KNO_3$ (molar ratio ether:$NaNO_3$:$KNO_3$ = 1.5:1:1) in 150 ml of water was filtered five times through the column at a rate of about 60 drops per minute. Analytically the molar ratio Na:K in the solution showed an increase from 1.0 before the filtration to 1.6 after filtration. The column was cleaned by first eluting the cyclic ether with methylene chloride and then the salts with water.

(b) A mixture of 20 g of active carbon, 0.8 g of "18-crown-6", 0.19 g of $NaNO_3$ and 0.23 g of $KNO_3$ in 150 ml of water was stirred well for an hour, and the mixture was then filtered on a glass filter. The filtrate showed the same increase in the molar ratio Na:K from 1.0 to 1.6 as under (a) above.

EXAMPLE 7

This example illustrates selective adsorption of KI from a mixture of KCl and KI.

A mixture of 0.25 g of KCl, 0.55 g of KI, 1.2 g of "18-crown-6", (molar ratio ether:KCl:KI = 1.5:1:1), 30 g of active carbon and 200 ml of water was stirred well for 1 hour, and the slurry was filtered on a glass filter. The filtrate was evaporated and found upon analysis to contain 0.21 g of KCl and 0.10 g of KI, corresponding to an increase in the molar ratio Cl:I from 1.0 to 4.7 in the filtrate. Regeneration of cyclic ether and salt was carried out as in example 1.

EXAMPLE 8

This example illustrates selective adsorption of $KNO_3$ from a mixture of $KNO_3$ and KCl.

25 g of active carbon were boiled with water and packed in a glass column. 0.99 g of "18-crown-6" were dissolved in 50 ml of water and added to the column. 0.125 g $KNO_3$ + 0.095 g KCl (molar ratio ether:$KNO_3$KCl = 1.5:1:1) were dissolved in 100 ml of water and filtered twice through the column. Analysis of the filtrate showed 0.034 g of $KNO_3$ and 0.066 g of KCl, corresponding to an increase in the molar ratio KCl:$KNO_3$ from 1.0 to 2.6. Regeneration was carried out as in example 1.

EXAMPLE 9

This examples illustrates the use of pentaoxacyclopentadecane ("15-crown-5") or polyethylene glycol 1540 ("Carbowax"), m.p. 43-46° C., for adsorption of magnesium nitrate from water.

20 g of active carbon, 1 g of pentaoxacyclopentadecane and 0.19 g of $Mg(NO_3)_2$ in 200 ml of water were stirred well for 5 minutes. The slurry was filtered on a glass filter. The filtrate contained 0.087 g of $Mg(NO_3)_2$ (corresponding to 55% adsorption). With polyethylene glycol 1540 the filtrate contained 0.075 g of $Mg(NO_3)_2$ (corresponding to 60% adsorption).

EXAMPLE 10

This example illustrates the use of pentaoxacyclopentadecane or polyethylene glycol for adsorption of calcium nitrate from water.

20 g of active carbon, 1 g of pentaoxacyclopentadecane and 0.17 g of Ca(NO$_3$)$_2$ in 200 ml of water were stirred well for 5 minutes and filtered on a glass filter. The filtrate contained 0.087 g of Ca(NO$_3$)$_2$ (corresponding to 49% adsorption). With polyethylene glycol the filtrate contained 0.076 g of Ca(NO$_3$)$_2$ (corresponding to 55% adsorption).

EXAMPLE 11

This example illustrates the use of a cyclic polyether for adsorption of barium chloride from water.

30 g of active carbon packed in a glass column were charged with 1.2 g of hexaoxacyclooctadecane ("18-crown-6") dissolved in water. A solution of 0.69 g of BaCl$_2$ dissolved in 100 ml of water was filtered 3 times through the column. The barium chloride content in the filtrate was 0.04 g (corresponding to 42% adsorption).

EXAMPLE 12

This example illustrates the use of a cyclic polyether for adsorption of chromium nitrate from water.

20 g of active carbon packed in a glass column were charged with 1 g of hexaoxacyclooctadecane dissolved in water. A solution of 2.22 g of Cr(NO$_3$)$_3$.9H$_2$O in 100 ml of water was filtered 3 times through the column. The salt content in the filtrate was 0.83 g (corresponding to 42% adsorption).

EXAMPLE 13

Adsorption of Iron Nitrate From Water

The same procedure was carried out as in example 12. A solution of 2.24 g of Fe(NO$_3$)$_3$.9H$_2$O yielded 0.75 g of salt in the filtrate (corresponding to 66% adsorption).

EXAMPLE 14

Adsorption of Cobalt Nitrate From Water

The same procedure was carried out as in example 12. A solution of 1.62 g of Co(NO$_3$)$_2$.6H$_2$O yielded 0.76 of salt in the filtrate (corresponding to 53% adsorption).

EXAMPLE 15

Adsorption of Nickel Nitrate From Water

The same procedure was carried out as in example 12. A solution of 1.62 g of Ni(NO$_3$)$_2$.6H$_2$O yielded 0.71 g of salt in the filtrate (corresponding to 56% adsorption).

We claim:

1. A process for complete, partial or selective removal of a salt from an aqueous solution containing the salt, which comprises (1) contacting the aqueous solution with active carbon impregnated with a cyclic or linear polyether, said impregnation having been carried out by contacting the carbon with an aqueous solution of the polyether, and (2) successively eluting the polyether and the salt from the carbon, using a non-polar or slightly polar water-immiscible organic solvent to elute the polyether, and water to elute the salt.

2. A process according to claim 1, wherein the anion portion of the salt is inorganic.

3. A process according to claim 2, wherein the salt is a nitrate, a halide, a sulphate or a phosphate.

4. A process according to claim 1, wherein an aqueous solution of several salts in admixture is passed through a column packed with active carbon which in advance has been impregnated with the polyether, whereby the salts are adsorbed to different extents.

5. A process according to claim 1, wherein the polyether is a cyclic polyether which is an oligomer or polymer of ethylene oxide.

6. A process according to claim 1, wherein the aqueous solution contains one or more alkali metal salts.

* * * * *